(12) United States Patent
Steiner et al.

(10) Patent No.: US 6,425,452 B1
(45) Date of Patent: Jul. 30, 2002

(54) CONTROL SYSTEM FOR ALL-WHEEL DRIVE VEHICLE

(75) Inventors: Glenn M. Steiner, Medina; Roy I. Steiner, Dalton, both of OH (US)

(73) Assignee: Venture Products, Inc., Orrville, OH (US)

( * ) Notice: Subject to any disclaimer, the term of this patent is extended or adjusted under 35 U.S.C. 154(b) by 0 days.

(21) Appl. No.: 09/626,469

(22) Filed: Jul. 26, 2000

(51) Int. Cl.[7] .............................................. B60K 17/34
(52) U.S. Cl. ........................ 180/233; 180/235; 180/236; 180/237
(58) Field of Search .................... 180/235, 233, 180/242, 247, 248, 336, 337; 74/473.1, 531, 532, 527, 560; 280/244, 53, 53.1, 239, 241, 251

(56) References Cited

U.S. PATENT DOCUMENTS

| | | | |
|---|---|---|---|
| 2,765,862 A | | 10/1956 | Tucker ........................ 180/235 |
| 3,331,464 A | * | 7/1967 | Doorne ........................ 180/244 |
| 3,342,282 A | | 9/1967 | Forpahl ....................... 180/235 |
| 3,484,964 A | | 12/1969 | Jeffery ........................ 414/635 |
| 3,613,816 A | * | 10/1971 | Gutbrod ....................... 180/53 |
| 3,833,079 A | * | 9/1974 | Gego .......................... 180/444 |
| 3,880,542 A | * | 4/1975 | Mullen ........................ 404/101 |
| 3,916,625 A | * | 11/1975 | Holtkamp ..................... 60/421 |
| 3,978,937 A | * | 9/1976 | Chichester et al. ........... 180/44 |
| 4,043,416 A | * | 8/1977 | Albright et al. ............. 180/6.48 |
| 4,135,592 A | | 1/1979 | Wincent ....................... 180/19 |
| 4,164,155 A | * | 8/1979 | Reed et al. ................... 74/687 |
| 4,493,622 A | * | 1/1985 | Miller ......................... 418/57 |
| 4,809,489 A | | 3/1989 | Johansson .................... 56/14.7 |
| 4,819,508 A | | 4/1989 | Yamaoka et al. .............. 74/665 |
| 4,862,767 A | | 9/1989 | Hauser ......................... 74/687 |
| 4,903,545 A | | 2/1990 | Louis et al. .................. 74/606 |
| 4,932,209 A | | 6/1990 | Okada et al. ................. 60/487 |
| 4,947,956 A | | 8/1990 | Henline ....................... 180/234 |
| 4,977,732 A | | 12/1990 | Minter ........................ 56/11.4 |
| 4,977,760 A | * | 12/1990 | Ishimori et al. .............. 60/444 |
| 4,979,583 A | | 12/1990 | Thoma et al. ................ 180/62 |
| 5,207,060 A | * | 5/1993 | Sheets ......................... 60/483 |
| 5,533,587 A | | 7/1996 | Dow et al. ................... 180/235 |
| 6,256,989 B1 | * | 7/2001 | Hauser et al. ................ 60/487 |
| 2001/0014277 A1 | * | 8/2001 | Braud ......................... 414/680 |

FOREIGN PATENT DOCUMENTS

GB 2168015 A * 6/1986

* cited by examiner

*Primary Examiner*—Brian L. Johnson
*Assistant Examiner*—Daniel Yeagley
(74) *Attorney, Agent, or Firm*—Reese Taylor

(57) ABSTRACT

A drive system for all-wheel drive vehicles is provided having separate front and rear transaxles powered by a single engine through a power transfer system. The transaxles each include a hydrostatic transmission and an axle, the hydrostatic gearing system within the hydrostatic transmission serving, in conventional manner, to transfer power from the engine to the axle and drive wheel or wheels. Thus, the front and rear transmissions each may include driving shafts, lay shafts, gear wheels, differentials, and/or other drive train entities employed in the art. A single shifting mechanism associated with the gear systems within each hydrostatic transmission is employed to operate the separate hydrostatic transmissions in harmony.

9 Claims, 4 Drawing Sheets

CONTROL SYSTEM FOR ALL-WHEEL DRIVE VEHICLE

RELATED PATENT APPLICATIONS

None.

FIELD OF THE INVENTION

This invention relates in general to drive systems for all-wheel drive vehicles. In particular, the present invention relates to a drive system in which one power source, or engine, is connected to two separate transaxles arranged in a parallel relationship, one transaxle having a hydrostatic transmission associated with the front axle and drive wheel or wheels and the second transaxle having a hydrostatic transmission associated with the rear axle and drive wheel or wheels. The drive system further has a single shifter mechanism for operating the front and rear hydrostatic transmissions in harmony to provide an all-wheel drive, non-skid vehicle.

BACKGROUND OF THE INVENTION

All-wheel drive vehicles, whether three wheeled, four wheeled or others, commonly comprise a vehicle power source and drive train, with the power source transmitting the driving force to the various individual wheels of the vehicle through a transmission. These vehicles are well known in the prior art and are primarily designed for use in difficult terrain or difficult driving conditions. It is an object of all such vehicles to provide improved traction and handling in such conditions and it is therefore a common problem in such vehicles to transmit the driving force from the power source to each of the wheels equally without any sacrifice of performance in one or more of the wheels. Herein, a novel drive system for all-wheel drive vehicles is disclosed in which a single power source, or engine, and a single shifter mechanism are utilized to power and shift, in harmony, two separate hydrostatic transmissions.

U.S. Pat. No. 4,819,508 discloses a drive system in which a single power source, i.e. engine, is mounted between separate left and right hydrostatic transmissions that control, independently, the left and right final drive wheels. The engine's output shaft retains two wheels that each receive a belt. The belt associated with one wheel communicates with the input shaft of the left hydrostatic transmission, while the belt associated with the other wheel communicates with the input shaft of the right hydrostatic transmission. Thus, the single engine transfers power to two separate, left and right transmissions that in turn communicate with the left and right drive wheel or wheels of the vehicle. The separate left and right final drive wheels, through their associated transmissions, can be variably controlled through the operator's choice in order to accomplish forward, reverse, or steering motion.

The present invention is directed towards a somewhat similar drive system in that a single power source is associated with a pair of hydrostatic transmissions. However, in the present invention, the power source is mounted so that it will power separate front and rear hydrostatic transmissions that control, respectively, a front axle and associated wheel or wheels and a rear axle and associated wheel or wheels to provide an all-wheel drive vehicle. Further, the present invention is directed towards a drive system, wherein these drive train entities are placed in a parallel relationship and are interconnected with a shifter mechanism that imposes cooperative, simultaneous, and continuous behavior between the front and rear transmissions.

In such a vehicle, it should be readily apparent to those of ordinary skill in the art that it is necessary for the separate hydrostatic transmissions to always operate in harmony if satisfactory traction, handling and non-skid operation are to be accomplished. Heretofore in the art, conventional designs for all-wheel drive vehicles have provided single components and controls for drive train entities wherein these components control functions of the drive train entities before distributing power to those final drive components. There has been no drive system designed that accomplishes all-wheel drive in the manner herein described, and, thus, there exists a need in the art to provide an all-wheel drive vehicle that connects separate hydrostatic transmissions to a common power source wherein, further, the separate transmissions can be operated in harmony while the power from the single engine is being distributed to the final drive components.

SUMMARY OF THE INVENTION

It is therefore an object of the present invention to provide a drive system for an all-wheel drive vehicle wherein a single power source, hereinafter referred to as an engine, connects multiple separate hydrostatic transmissions.

It is another object of the present invention to provide a drive system for an all-wheel drive vehicle, as above, wherein a hydrostatic transmission is associated with each in-line axil.

It is another object of the present invention to provide a drive system for an all-wheel drive vehicle, as above, wherein a first transmission is associated with a front axle of the vehicle and a second transmission is associated with a rear axle.

It is yet another object of the present invention to provide a drive system for an all-wheel drive vehicle, as above, wherein the drive system includes a shifting mechanism that can operate all separate transmissions in harmony.

In general, these and other objects of the present invention that will become apparent from the description that follows are accomplished by a drive system for an all-wheel drive vehicle having a front hydrostatic transmission and associated front gearing system, a rear hydrostatic transmission and associated rear gearing system, an engine that supplies power to both the front and rear hydrostatic transmissions, and a shifting mechanism connected to both of the front and rear hydrostatic transmissions and capable of shifting the hydrostatic transmissions substantially simultaneously and in harmony.

A preferred exemplary drive system for an all-wheel drive vehicle incorporating the concepts of the present invention is shown by way of example in the accompanying drawings without attempting to show all the various forms and modifications in which the invention might be embodied, the invention being measured by the appended claims and not by the details of the specification.

BRIEF DESCRIPTION OF THE PREFERRED EMBODIMENTS

Figure 1:
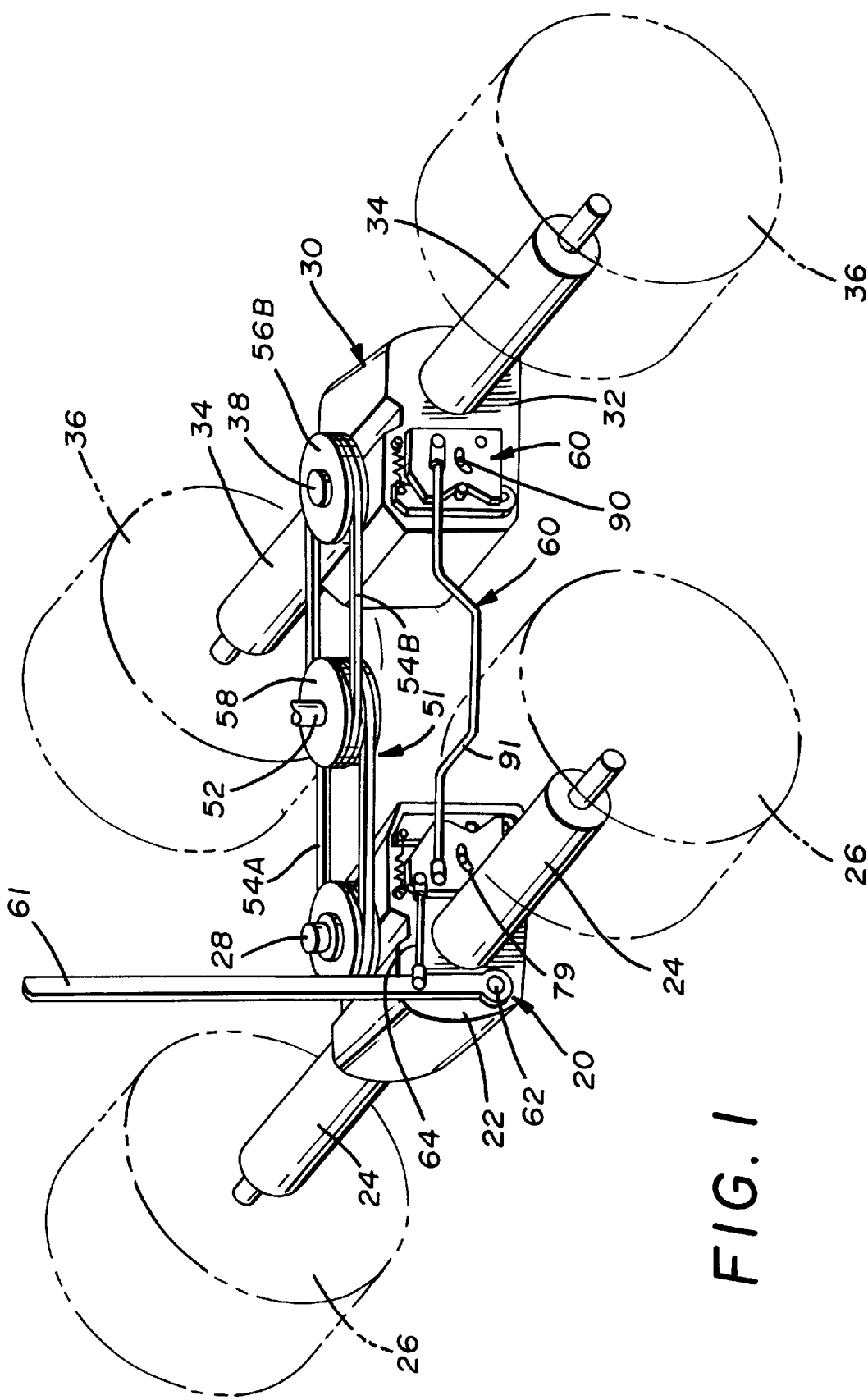
FIG. 1 is a perspective schematic view of the drive system of the present invention.
Figure 2:
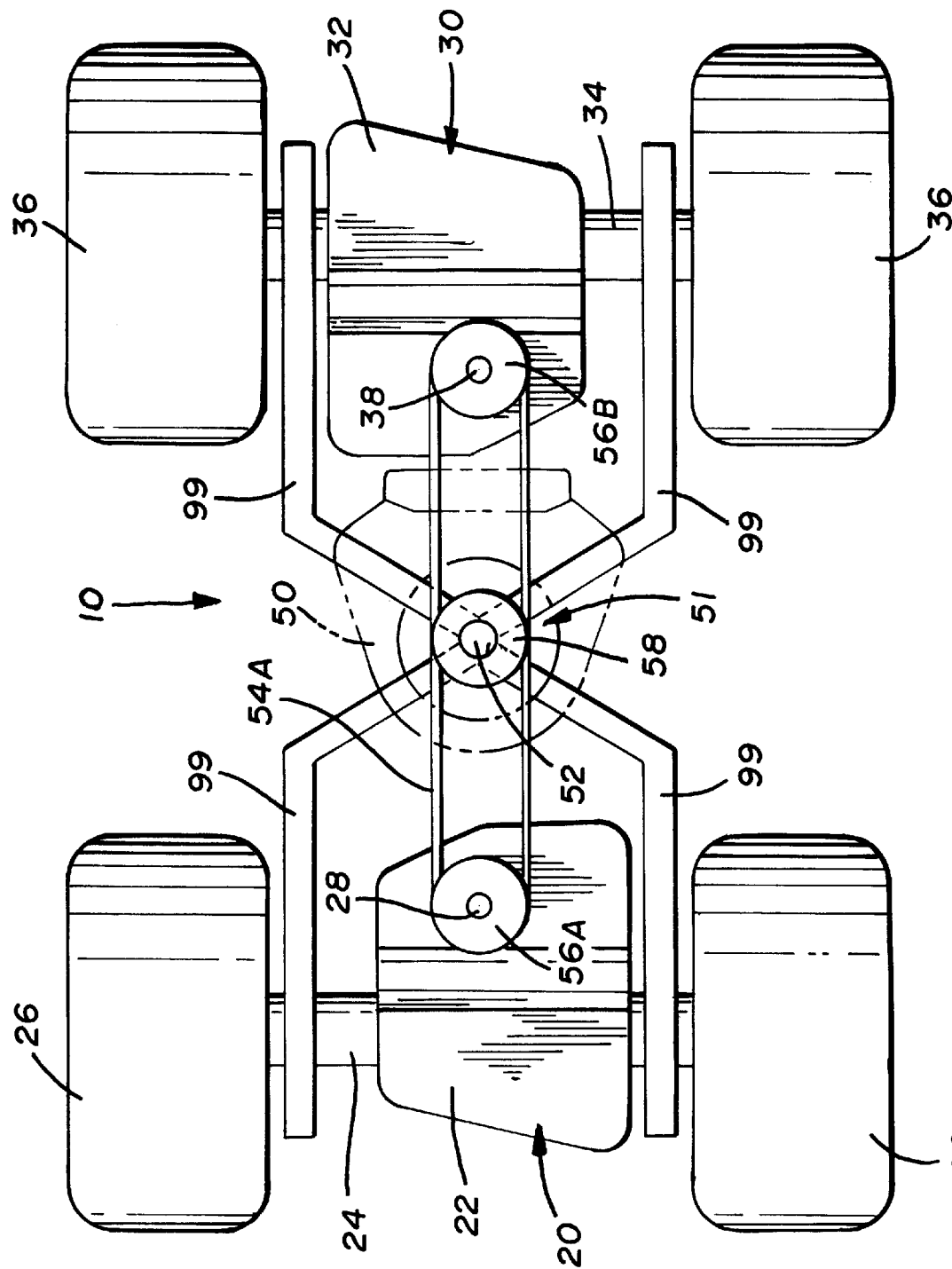
FIG. 2 is a top plan view thereof.
Figure 3:
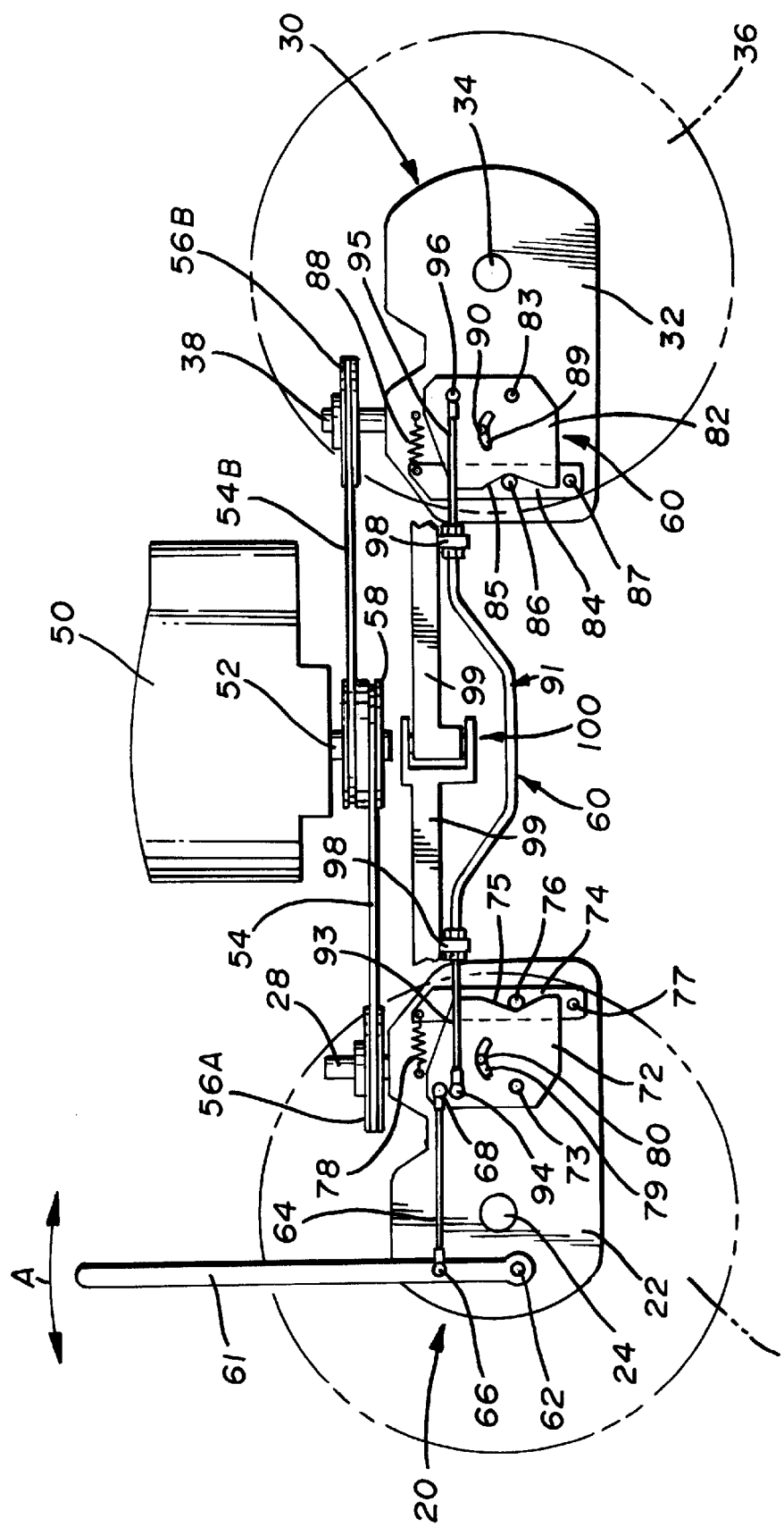
FIG. 3 is a side elevation view thereof.

FIGS. 1–3 of the drawings show the drive system of the invention in a generally schematic form. It is believed that these illustrations are adequate to teach those skilled in the art to replicate the invention inasmuch as the individual components of the present system are generally well known in the art.

Turning then to FIGS. 1–3, it will be seen that the drive system for an all-wheel drive vehicle, generally indicated by the numeral 10, includes separate transaxles 20 and 30. Transaxle 20 can be considered and is herein referred to as front transaxle 20, while transaxle 30 is herein referred to as rear transaxle 30. It should be understood, however, that for purposes of the present disclosure, front and rear transaxles 20,30 are substantially identical hydrostatic multi-drive train entities that provide the same ground speed results. As hydrostatic multi-drive train entities, front transaxle 20 and rear transaxle 30 include, respectively, front and rear hydrostatic transmissions 22,32 and front and rear axles 24,34.

Hydrostatic transmissions 22,32 generally represent the hydrostatic gearing system by which power is transmitted from the power source for drive system 10 to the axles 24,34 of the all-wheel drive vehicle with which drive system 10 is associated. Thus, as those of ordinary skill in the art will readily appreciate, hydrostatic transmissions 22,32 include, although not shown in the present drawings, those elements that are utilized in the art to effect such a hydrostatic transmittal of power. These elements may include, without limitation, driving shafts, lay shafts, gear wheels, and differentials. Power transferred to front axle 24 through front hydrostatic transmission 22 ultimately serves to rotate front wheels 26 while power transferred to rear axle 34 through hydrostatic rear transmission 32 ultimately drives rear wheels 36.

Drive system 10 employs a single engine 50 to supply power to front and rear transaxles 20,30 through a power transfer system 51. In the preferred embodiment depicted in the drawings, power transfer system 51 includes front and rear transmission input shafts 28 and 38, respectively. These input shafts 28,38, through the hydrostatic gearing systems embodied in transmissions 20,30, serve to drive axles 24,34 and associated wheels 26,36 and thus drive the vehicle in an all-wheel drive manner.

In the presently disclosed preferred embodiment of power transfer system 51, the sole engine 50 supplies power to the two hydrostatic transmissions 22,32 through a belt-and-pulley system wherein engine output shaft 52 communicates with and drives transmission input shafts 28,38 via belts 54A and 54B. Belt 54A is entrained over pulley 56A, which is mounted on front transmission input shaft 28, and pulley 58, which is mounted on engine output shaft 52. Similarly, belt 54B is entrained over pulley 56B, which is mounted on rear transmission input shaft 38, and, like belt 54A, is also entrained over pulley 58. Thus, operating engine 50 to effect rotation of engine output shaft 52, results in the rotation of both front and rear transmission input shafts 28,38, which rotation, through the gear systems of front and rear hydrostatic transmissions 22,32, drives front and rear wheels 26,36 at the same time.

It should be appreciated that the belt-and-pulley system disclosed herein is merely a preferred embodiment of power transfer system 51 for supplying power from a single engine 50 to front and rear transaxles 20, 30, and the present invention should not be limited thereto or thereby. As those skilled in the art will readily appreciate, additional means for utilizing a single power supply to power multiple transaxles may be developed, as, for instance, by positioning front and rear transaxles 20, 30 to face each other and powering these transaxles by a single engine driving a universal joint and shaft. Indeed, while the present invention relies upon the simultaneous driving of both front and rear wheels 26, 36, the present invention should not be limited to any specific structure or device for achieving this all-wheel drive.

Such a configuration of drive system components brings about all-wheel drive characteristics as described above; however, a drive system employing this configuration must provide that the individual sets of front and rear transaxles 20,30 operate in harmony if mechanically practical, non-skid, all-wheel drive is to be accomplished. By "operate in harmony," it is meant that the front and rear transaxles 20,30 must be operating substantially simultaneously and identically such that one set of wheels 26 or 36 is not operating at a different speed or on a different gear ratio than the other set of wheels 26 or 36. Thus, provision must be made that front hydrostatic transmission 22 and rear hydrostatic transmission 32 begin in and maintain the same ground speed and direction of travel at all times.

As mentioned throughout the present disclosure, all-wheel drive vehicle 10 operates through front and rear hydrostatic transmissions 22, 32. As those of ordinary skill in the art would readily appreciate, the main components of a hydrostatic transmission consist of a pump and hydraulic motor, wherein the pump delivers fluid under pressure to the hydraulic motor, which, in turn, produces torque at the drive shaft. A swash plate is used to control the pump and motor displacement through a trunnion shaft, thereby controlling the fluid displacement and, consequently, the ground speed and direction of travel of the vehicle.

In order to ensure that the ground speed and direction of travel is the same for both transmissions 22,32, a shifting mechanism 60 is provided in drive system 10 to harmoniously manipulate the hydrostatic gearing systems within hydrostatic transmissions 22,32.

Figure 4:
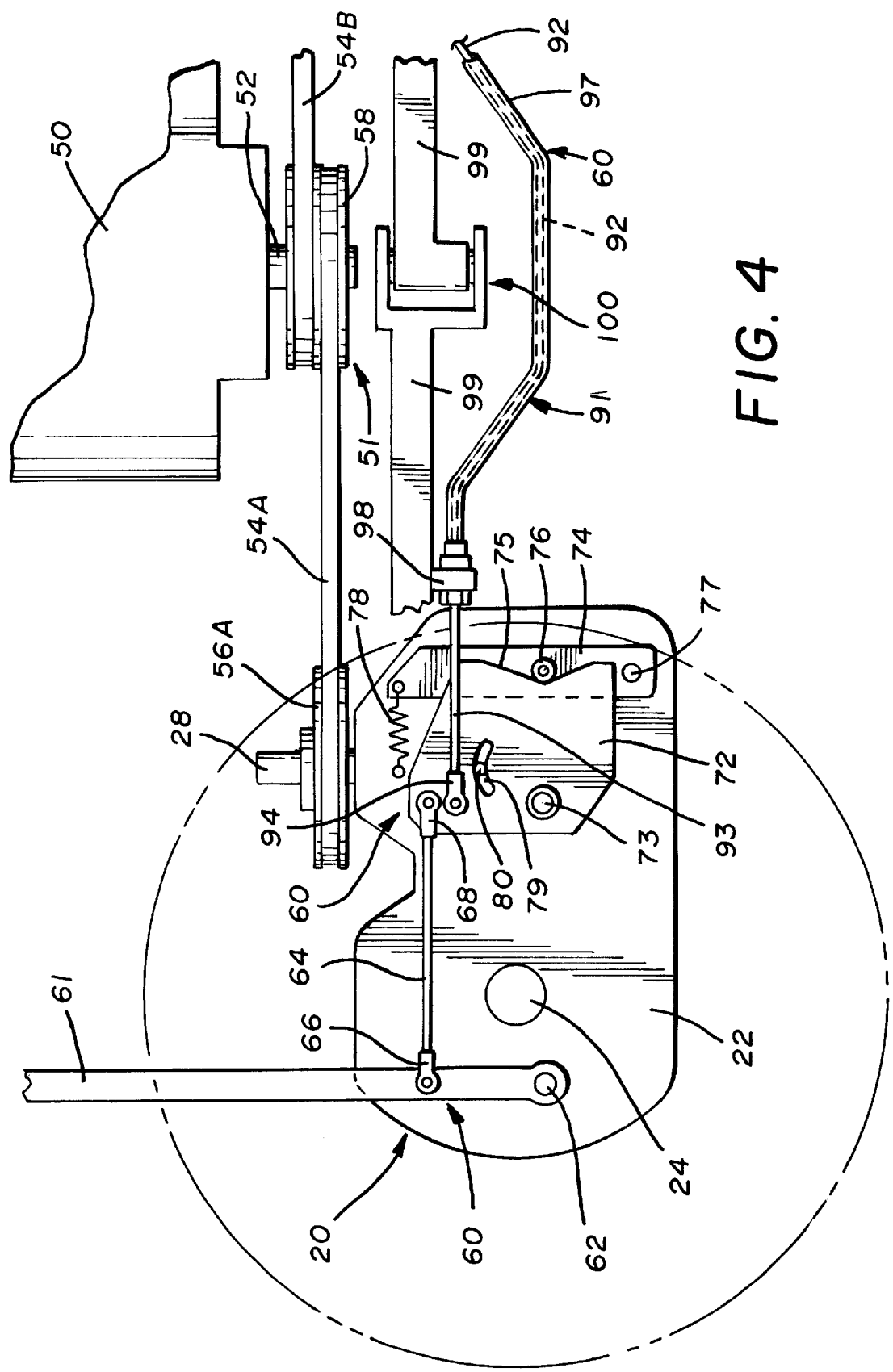
FIG. 4 is an enlarged side view of the front transaxle and its associated shifting mechanism.

Turning now to FIGS. 1, 3 and 4, it can be seen that front and rear hydrostatic transmissions 22,32 are simultaneously and cooperatively controlled by lever 61 of shifting mechanism 60. Lever 61 is connected to front hydrostatic transmission 22 by a pin 62 that allows lever 61 to pivot between a plurality of positions. Indeed, aside from its neutral position as shown in FIG. 3, lever 61 has no set position in which it rests, but rather lever 61 may freely pivot either forwards or backwards as represented by arrow A in FIG. 3. As those of ordinary skill in the art will readily appreciate, lever 61 freely pivots and thereby allows for a completely variable speed control in either the forward or reverse direction due to its connection with front and rear hydrostatic transmissions 22 and 32, through the remainder of shifting mechanism 60, as will be explained more fully herein below.

Connected to lever 61 between its connection point at pin 62 and its distal end, but preferably at a position proximate to pin 62, is link 64, which connects lever 61 to the remainder of shifting mechanism 60. Link 64 is attached to rod 66, which is in turn removably attached to lever 61. Link 64 is also attached to rod 68, which is, in turn, removably attached to front swash plate 72. Front swash plate 72 is pivotally connected to front transaxle 20 around front trunnion shaft 73.

As should be apparent from the referenced drawings, manipulating lever 61 manipulates front swash plate 72 in a proportional manner through link 64. Manipulation of front swash plate 72 in turn manipulates front trunnion shaft 73 to change the orientation of the hydrostatic gear system within front hydrostatic transmission 22 in a conventional manner such that the mechanical advantage or gearing of front axle 24 is altered. The cause and effect just described is well known in the art, and the present invention, as indicated above, is not limited to or by any particular hydrostatic gear system and its operation within front hydrostatic transmission 22.

Hydrostatic transmissions have the advantage of being able to produce an infinite range of gear ratios because the swash plate angle is completely variable within the swash plate's range of motion and, therefore, so is the fluid displacement. In the all-wheel drive vehicle 10 of the present invention, lever 61 is used to control the displacement of swash plate 72 through the manipulation of front swash plate 72 and front trunnion shaft 73 as described hereinabove. Pushing lever 61 forward displaces the motor and pump of front hydrostatic transmission 22 such that front axle 24 and its associated wheels 26 rotate so as to move the vehicle 10 forward. Likewise, pulling back on lever 61 displaces the motor and pump of front hydrostatic transmission 22 such that front axle 24 and its associated wheels 26 move vehicle 10 in the reverse direction. When lever 61 is in a neutral position, the displacement of the pump and motor within front hydrostatic transmission 22 is such that the vehicle 10 remains at rest. Lever 61 is shown in this neutral position in FIGS. 1, 3, and 4 wherein lever 61 extends substantially vertically from its point of connection with front hydrostatic transmission 22. Of course, this neutral position may be varied such that the neutral position of lever 61 may exist when lever 61 is displaced at some angle from this vertical position.

As shown in FIG. 4, lever 61 is maintained in this vertical, neutral position by groove 75 in front swash plate 72 and roller 76, which is attached to and capable of rotating on front neutral plate 74. Front neutral plate 74 is capable of pivoting at pin 77 such that, when force is applied to lever 61, front neutral plate 74 is displaced as link 64 pushes or pulls front swash plate 72 and thereby causes rollers 76 to follow the path of groove 75. When force is removed from lever 61, shifting mechanism 70 returns to the neutral position and thereby brings vehicle 10 to a stop. The neutral position is achieved by spring 78 which pulls on front neutral plate 74 such that roller 76 moves back to its neutral position as shown in FIG. 4.

The range of motion of lever 61, and thereby the range of displacement that can be affected between the motor and pump of front hydrostatic transmission 22 is dictated by channel 79 and stop 80. As lever 61 is moved axially about pin 62, front swash plate 72 is moved axially about trunnion shaft 73, but this axial motion is impeded when stop 80 contacts either end of channel 79.

Having now discussed the operation of shifting mechanism 60 in relation to front hydrostatic transmission 22, reference is now made specifically to FIG. 3 in order to describe how shifting mechanism 60 operates rear hydrostatic transmission 32 in harmony with front hydrostatic transmission 22.

Looking now to rear transmission 32, it can be seen that shifting mechanism 60 further includes rear swash plate 82, rear trunnion shaft 83, rear neutral plate 84, groove 85, roller 86, pin 87, spring 88, channel 89 and stop 90. These "rear" elements of shifting mechanism 60 function like their corresponding "front" elements to manipulate rear hydrostatic transmissions 32. Thus, as mentioned above with respect to front swash plate 72, the manipulation of rear swash plate 82 manipulates the orientation of the hydrostatic gear system within rear hydrostatic transmission 32 such that the mechanical advantage or gearing of rear axle 34 is altered. Simply put, front and rear swash plates 72,82 through front and rear trunnion shafts 73, 83 serve to control all of the drive train functions of drive system 10.

Mechanical linkage 91 of shifting mechanism 60, which is preferably a cable-and-sheath linkage, connects between front and rear swash plates 72,82 such that the gearing systems within transmissions 22,32 are shifted substantially simultaneously and identically through manipulation of lever 61. Particularly, mechanical linkage 91 includes a cable 92 having a front link portion 93 that connects to front swash plate 72 at rod 94. Rear link portion 95 of cable 92 connects to rear swash plate 82 at rod 96. Cable 92 is partially encased in a sheath 97 that is supported at connecting 98 on frame members 99 of all wheel-drive vehicle 10. Preferably, front and rear link portions 93, 95 are threaded into their associated rods 94, 96 so that the length of cable 92 can be kept taut by threading cable 92 into or out of rods 94, 96 at front and rear link portions 93, 95.

When front swash plate 72 is manipulated by movement of lever 61, mechanical linkage 92 is likewise manipulated and will, in turn, cause rear swash plate 82 to which it is connected to be manipulated in a substantially identical manner such that front and rear hydrostatic transmissions 22, 32 are operated in harmony. Of course, it should be appreciated that lever 61 is merely a manipulation element herein preferred, and the manipulation of shifting mechanism 60 may be accomplished by other provided elements such as a foot pedal or other shifting elements that could be contemplated by those of ordinary skill in the art.

It will be noted that the vehicle schematically shown in the drawings is a four-wheel drive vehicle. However, it should be noted that the principles of the present invention can equally well be employed with a three-wheel drive vehicle or, indeed, with more than four-wheel drive, if desired. Furthermore, it is contemplated that the present invention will also have utility when utilized in connection with an articulated and/or conventionally steered vehicle such as for example, a lawn mower in which the operator rides on one component of the articulated system and the mower, blade, etc., are mounted on the other. Indeed, FIG. 3 is a representation of an articulated vehicle, the joining of the separate frame components being visually depicted at 100. In either instance, the transmission of power from the power source to the wheels is uniform when utilizing the present invention.

While a full and complete description of the invention has been set forth in accordance with the dictates of the patent statutes, it should be understood that modifications can be resorted to without departing from the spirit hereof or the scope of the appended claims.

What is claimed is:

1. A drive system for an all-wheel drive vehicle, comprising:
   a) a front hydrostatic transaxle including a front hydrostatic transmission, a front gearing system and a front axle;
   b) a rear hydrostatic transaxle substantially identical to said front hydrostatic transaxle and including a rear hydrostatic transmission, a rear gearing system, and a rear axle;
   c) an engine connected to both said front and said rear transmissions; and
   d) a shifting mechanism continuously directly connected between both said front and said rear transaxles and capable of shifting said front and rear transmissions substantially simultaneously and identically.

2. A drive system for an all-wheel drive vehicle according to claim 1, wherein said engine supplies power to both said front and rear hydrostatic transaxles through a variable power transfer system operatively connected to said front and said rear transmissions.

3. A drive system for an all-wheel drive vehicle according to claim 2, wherein said variable power transfer system is a belt-and-pulley system.

4. A drive system for an all-wheel vehicle according to claim 3, wherein said belt-and-pulley system comprises:
   a) an output shaft associated with said engine;
   b) an input shaft associated with said front transmission;
   c) an input shaft associated with said rear transmission;
   d) a first belt associated with said output shaft and one of said input shafts; and
   e) a second belt associated with said output shaft and the other of said input shafts.

5. A drive system for an all-wheel drive vehicle according to claim 1, wherein said shifting mechanism comprises:
   a) a front swash plate having a front trunnion shaft communicating with said front transmission such that the manipulation of said swash plate manipulates said associated gearing system of said front transmission;
   b) a rear swash plate having a rear trunnion shaft communicating with said rear transmission such that the manipulation of said rear swash plate manipulates said associated gearing system of said rear transmission; and
   c) and a linkage connected between said front and rear swash plates such that the manipulation of one of said front or rear swash plates results in the substantially simultaneous and identical manipulation of the other of said front or rear swash plates.

6. A drive system for an all-wheel drive vehicle according to claim 5, wherein the drive system further comprises a pivotal lever connected to either of said front or rear swash plates such that manipulation of said pivotal lever results in the manipulation of said front or rear swash plate to which said link is connected, this manipulation in turn resulting in the manipulation of the other of said front or rear swash plate through said linkage.

7. A drive system for an all-wheel drive vehicle according to claim 4, wherein said shifting mechanism comprises:
   a) a front swash plate having a front trunnion shaft communicating with said front transmission such that the manipulation of said swash plate manipulates said associated gearing system of said front transmission;
   b) a rear swash plate having a rear trunnion shaft communicating with said rear transmission such that the manipulation of said rear swash plate manipulates said associated gearing system of said rear transmission; and
   c) and a linkage connected between said front and rear swash plates such that the manipulation of one of said front or rear swash plates results in the substantially simultaneous and identical manipulation of the other of said front or rear swash plates.

8. A drive system for an all-wheel drive vehicle according to claim 7, wherein the drive system further comprises a pivotal lever connected to either of said front or rear swash plates such that manipulation of said pivotal lever results in the manipulation of said front or rear swash plate to which said link is connected, this manipulation in turn resulting in the manipulation of the other of said front or rear swash plate through said linkage.

9. A drive system for an all-wheel drive vehicle according to claim 1 wherein said front and said rear transmissions comprise variable mechanical transmissions.

\* \* \* \* \*